United States Patent [19]

Gilmer et al.

[11] Patent Number: 4,477,235
[45] Date of Patent: Oct. 16, 1984

[54] SUBMERGED MOTOR-PUMP UNIT

[75] Inventors: André Gilmer, Aulnay-sous-Bois; Jacques Romand-Monnier, Delle; Jean-Pierre Lejeune, Beaucourt, all of France

[73] Assignee: Alsthom-Atlantique, Paris, France

[21] Appl. No.: 480,616

[22] Filed: Mar. 30, 1983

[30] Foreign Application Priority Data

Mar. 31, 1982 [FR] France ................................ 82 05500

[51] Int. Cl.³ ........................ F04B 17/00; H02K 5/10; H02K 5/12
[52] U.S. Cl. ................................ 417/414; 184/45 R; 310/87
[58] Field of Search ............................ 220/22.4, 22.6; 417/414, 424; 310/87; 184/45 A, 45 R; 175/227, 228, 229

[56] References Cited

U.S. PATENT DOCUMENTS

| | | | |
|---|---|---|---|
| 2,011,616 | 8/1935 | Clarke | 184/45 R |
| 2,236,887 | 4/1941 | Arutunoff | 417/424 X |
| 2,739,252 | 3/1956 | Patterson et al. | 417/424 |
| 2,962,612 | 11/1960 | Lung | 310/87 |
| 3,052,804 | 9/1962 | Komar | 310/87 |
| 3,255,367 | 6/1966 | Schaefer | 310/87 |
| 3,369,137 | 8/1965 | Sanger | 310/87 |

Primary Examiner—Richard E. Gluck
Assistant Examiner—T. Olds
Attorney, Agent, or Firm—Sughrue, Mion, Zinn, Macpeak & Seas

[57] ABSTRACT

A motor-pump unit for submerging down a well, e.g. an oil well, comprises a motor portion driving a pump portion. The motor portion is filled with fluid to prevent ingress of the surrounding medium which the pump portion pumps. The fluid is maintained at a higher pressure than the surrounding medium by including a flexible tank filled with fluid and in communication with the fluid in the motor portion. The flexible tank is compressed both by the surrounding medium and by resilient compression means so that the pressure inside the motor is higher than the surrounding pressure, thereby ensuring any leakage is outwardly from the motor. Down the well the temperature rises causing the fluid to expand, so the flexible tank is left substantially empty when the unit is prepared at the surface prior to lowering. If a large rise in temperature is to be expected, a resilient compression means which provides adequate excess pressure near the top of the well as the unit is lowered, will provide too much excess pressure at operating depths, and similarly compression means which provide adequate excess pressure at operating depths do not supply enough near the surface. This problem is solved by providing compression means which includes a first spring (79) and a second spring (80) so disposed that the flexible tank (66) is subjected to the sum of their resilient thrusts, with the second spring applying its thrust via release means (83 to 88) which cause said second spring to be released and to relax once its displacement reaches a predetermined value.

3 Claims, 6 Drawing Figures

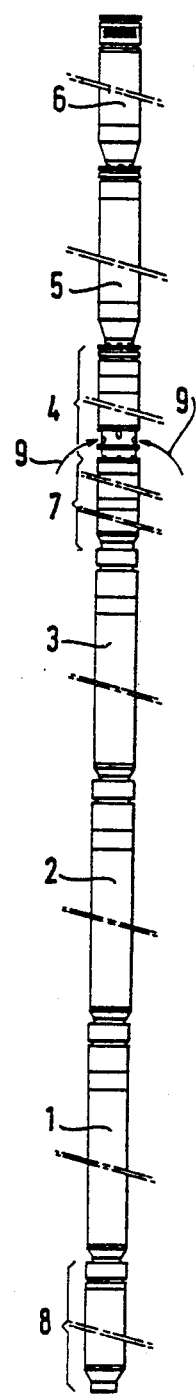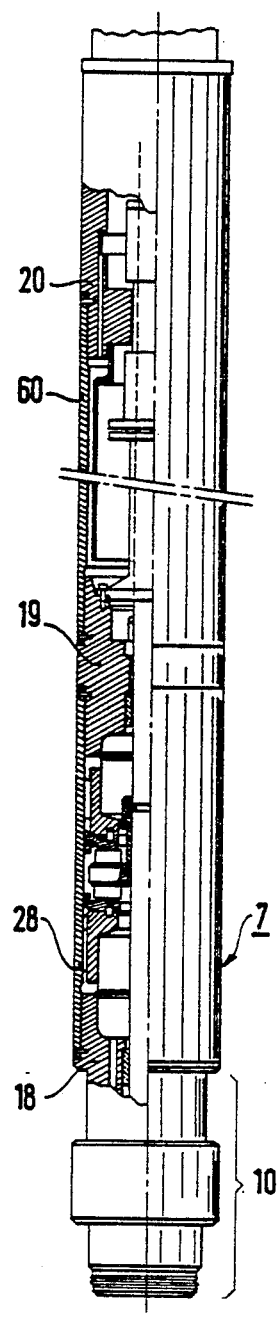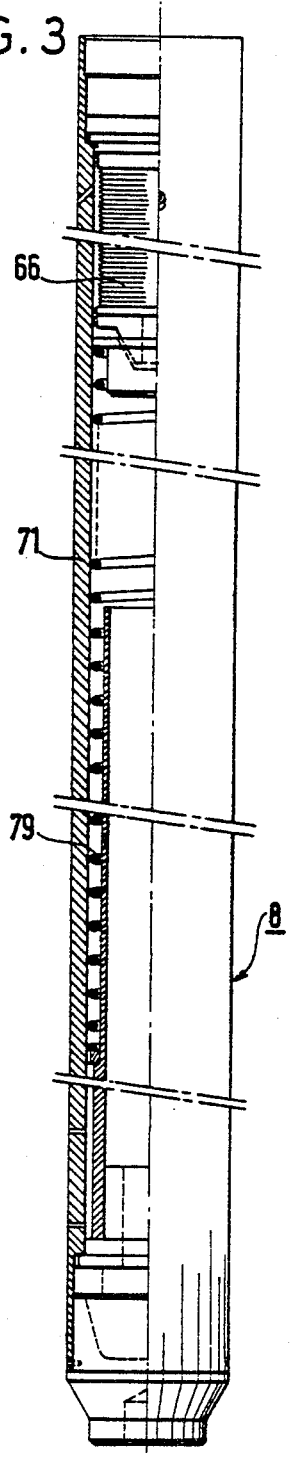

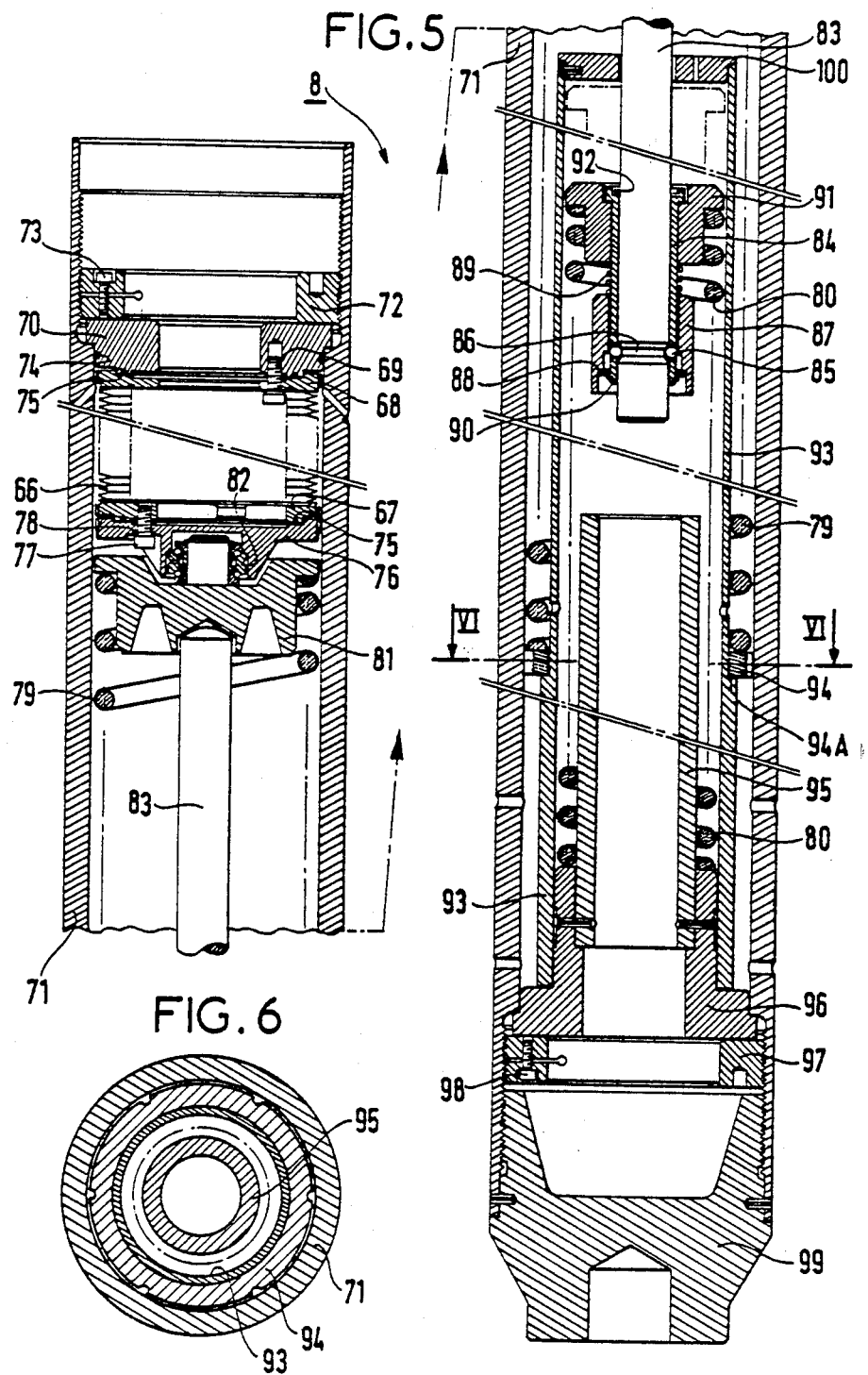

4,477,235

SUBMERGED MOTOR-PUMP UNIT

The present invention relates to a motor-pump unit for use submerged in a well, eg. an oil well.

BACKGROUND OF THE INVENTION

U.S. Pat. No. 3,369,137 in the name of R. A. Sanger describes a motor-pump unit in which the motor portion is filled with a fluid to protect it from the surrounding medium. At the top end of the motor portion, the unit includes a dynamic sealing system separating the motor portion and its protective fluid from the pump portion which is driven by the motor portion and which is in direct contact with the surrounding medium. Underneath the motor portion and beyond the end of its shaft, there is a flexible compensation tank or bag communicating with the motor portion. Said flexible tank is subjected both to the pressure of the surrounding medium and to the action of spring compression means arranged to ensure that fhe fluid pressure inside the flexible tank, and hence inside the motor portion, is greater than the pressure of the surrounding medium. Thus any leakage which may occur through the dynamic seal will be protective fluid leaking from the motor portion into the well, rather than surrounding medium leaking from the well into the motor portion.

In very deep wells, motor-pump units are generally constituted by an assembly of several very long motors of small diameter, eg. three motors each of which is eight to nine meters long, with several coupled pumps mounted above them. While such a unit is being lowered down the well, its temperature rises, and there comes a point where the pressure inside the motor portion is excessive because of the expansion of the oil in the flexible tank. Thus such flexible tanks are not suitable for use in some the deeper and hotter wells in which motor-pump units are to be installed.

Preferred embodiments of the present invention mitigate this drawback and make it possible to use such flexible tanks at greater depths and temperatures than before.

SUMMARY OF THE INVENTION

The present invention provides a motor-pump unit for use submerged in a well, the motor-pump unit comprising a motor portion, a pump portion, and a dynamic sealing system, the motor portion being located below the pump portion and being filled with a fluid to protect the motor portion from ingress of a medium which surrounds the motor-pump unit in use, the pump portion being connected to be driven by the motor portion to pump said surrounding medium, and the dynamic sealing system being located between the motor portion and the pump portion to transmit drive from the motor portion to the pump portion while preventing ingress of said surrounding medium into the motor portion, wherein the motor portion includes a flexible compensation tank situated at the bottom thereof and in communication with said fluid in the motor portion, said flexible tank being subjected both to pressure from the surrounding medium and to a compression force exerted by resilient compression means acting between the remainder of the motor portion and a wall of the flexible tank, thereby ensuring that the fluid inside the motor portion is at a higher pressure than the surrounding medium so that any leakage through the dynamic sealing means is outwardly from the motor portion rather than inwardly, the improvement wherein said compression means includes a first spring and a second spring so disposed that the flexible tank is subjected to the sum of their resilient thrusts, and wherein said second spring applies its thrust via release means which cause said second spring to be released and to relax once its displacement reaches a predetermined value.

Both of said first and second springs may apply their thrust to the flexible tank via an assembly including a ball-bearing thrust member arranged to prevent torsion being transmitted to the tank.

Said release means may comprise: a rod connected to transmit thrust to the tank; a tube slidably mounted on said rod; said second spring being disposed to apply thrust to said tube; said rod having a peripheral groove and said tube having openings through its wall aligned with said groove and receiving ball bearings for transmitting thrust between the tube and the rod; a sleeve slidably mounted on said tube and covering said openings to hold the ball bearings captive; and a stop disposed to engage said sleeve and hold it substantially at said predetermined value of displacement, the arrangement being such that any further displacement of the rod causes the tube to slide relative to the sleeve against the resilient action of the second spring until the sleeve uncovers the openings, thereby releasing the balls, whereupon thrust is no longer transmitted between the rod and the tube, thereby leaving the second spring free to relax.

BRIEF DESCRIPTION OF THE DRAWINGS

An embodiment of the invention is described by way of example with reference to the accompanying drawings, in which:

FIG. 1 is a side view of a motor-pump unit in accordance with the invention;

FIG. 2 is a partially cut-away side view on a larger scale of a sealing module in the unit shown in FIG. 1;

FIG. 3 is a partially cut away side view on the same scale as FIG. 2 of a flexible tank module together with its associated means for keeping the motors under excess pressure;

FIG. 5 is a more detailed view of the FIG. 3 module on a larger scale; and

FIG. 6 is a section along a line VI—VI in FIG. 5.

MORE DETAILED DESCRIPTION

Figure 4:
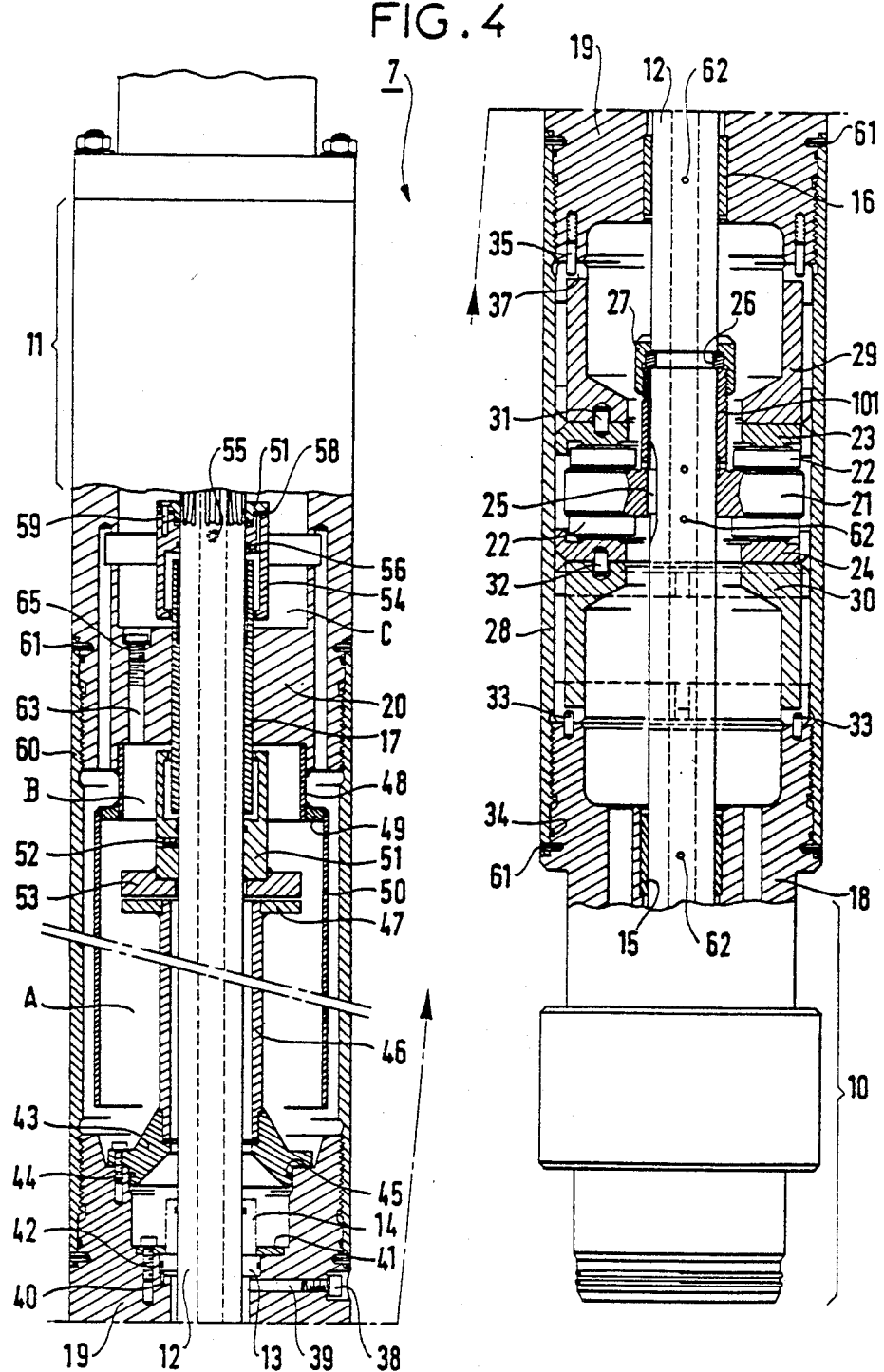
FIG. 4 is a more detailed view of the FIG. 2 module on a larger scale.

FIG. 1 shows a motor-pump assembly comprising a plurality of modules. As shown the assembly comprises three motors 1, 2 and 3, a gas separator 4, two pumps 5 and 6, a sealing module 7 above the motors, and a bottom module 8 which includes a flexible compensation tank and means for ensuring that the pressure of fluid (oil) inside the motors is above the pressure of the surrounding medium (crude oil, if the assembly has been lowered down an oil well).

The pump portion comprising pumps 5 and 6 is driven by rotation of the motors 1, 2 and 3, and pump suction takes place at the same level as the gas separator 4 as shown by arrows 9.

The sealing module 7 located on top of the pumps, is described with reference to FIG. 4. The bottom of the sealing module 7 is connected to the top of the top motor 3 by means of a coupling 10, not shown in detail. The top of the sealing module 7 is connected to the bottom of the gas separator module 4 by means of a coupling 11, again not shown in detail.

The sealing module 7 has a shaft 12 passing therethrough for transmitting drive from the motors to the pumps.

The sealing module 7 serves to separate the fluid inside the motors, namely oil, from the surrounding medium, usually crude oil, which is in communication with the pumps. It comprises a mechanical dynamic seal having a fixed bushing 13 and a rotary bushing 14. A mechanical fitting compensated by a welded metal bellows may be used to compensate for expansion of the shaft 12.

The shaft 12 has three sleeves 15, 16 and 17 held in three bearings 18, 19 and 20, and it is held against axial displacement by stop means comprising two oscillating shoe stops mounted in opposition on either side of a stop collar 21. Each stop may comprise six oscillating shoes such as 22, for example, mounted in a ring on a support 23 or 24. The stop collar 21 is prevented from rotating relative to the shaft 12 by a spline 25, and is prevented from moving axially along the shaft by two semi-circular members 26 which are received in a groove in the shaft 12 and which are held by a nut 27 against the end of a sleeve 101 extending along the shaft from the stop collar 21. The stops are held in an outer tube 28 by upper and lower spacer members 29 and 30. The spacer members 29 and 30 are linked to the shoe supports 23 and 24 against rotation by means of pegs 31 and 32. The lower spacer 30 bears against the bearing 18 and is prevented from rotating relative thereto by means of pegs 33. The lower bearing 18 is screwed into the outer tube 28 and sealing is provided by a sealing ring 34.

The bearing 19 is screwed to the top of the outer tube 28. Two pegs 35 are spring mounted on the bearing 19 in such a manner that, when the bearing 19 is screwed into the outer tube 28, the pegs 35 are pushed into oil passages 37 in the upper spacer 29. Once the pegs have entered said passages, further screwing of the bearing 19 causes the upper spacer 29 to rotate together with the support 23 for the shoes 22 of the upper stop.

The bearing 19 has a screw 38 closing a bleed hole 39.

The fixed bushing 13 on the mechanical sealing fitting is housed in the bearing 19, and it is prevented from rotating by a peg 40 and from moving axially by a washer 41 which is screwed to the bearing 19 by three screws 42.

The module further includes means for protecting the mechanical sealing fitting from solid particles which may enter the upper portion of the module where it is in communication with the surrounding medium. These protection means comprise first and second fixed assemblies and two rotary deflectors. The first fixed assembly comprises three members which are welded together: a fixing cone 43, a tube 46 and a flange 47. The fixing cone 43 is fixed to the bearing 19 by screws 44 and sealing is provided by an O-ring 45. The second fixed assembly comprises a generally bell-shaped assembly which is fixed to the bearing 20 and which fits over the flange 47 and the tube 46. The bell is made up from a relatively short tube 48, an outwardly extending ring 49 around its lower rim, and a relatively long tube 50 of larger diameter than the tube 48. The rotary deflectors comprise: a lower deflector 51 which is held fast to the shaft by a screw 52, which has a disk 53 facing the flange 47, and which acts on solid particles by the centrifugal effect; and an upper deflector 54 which is held to the shaft 12 by a screw 55 and which is sealed by an O-ring 56. A stopper 57 is fixed to the upper deflector 54 by screws 59, with a gasket 58 being clamped in between the stopper 57 and the deflector 54. A bleed hole 63 extends through the bearing 20 into the chamber B defined by the smaller tube 48 in the bell-shaped assembly. The bleed hole is plugged by a plug 65.

The upper bearing 20 is screwed to an outer tube 60 which is itself screwed to the intermediate bearing 19. The bearings 18, 19 and 20 are prevented from rotating relative to the outer tubes 28 and 60 by pins 61.

The shaft 12 is hollow, and below the mechanical sealing fitting's fixed bushing 13, it has communications holes 62 for feeding oil to all the points that require it. For the sake of simplifying the drawing, most of the dashed lines have been omitted, but they have been drawn just beneath the stop collar to show oil passages through the lower spacer 30.

The bottom module 8 is now described. Its function is to provide a store of oil and to keep it the oil in the motors at a higher pressure than the surrounding medium, thereby ensuring that the upper sealing module 7 works effectively, particularly around the mechanical sealing fitting 13 and 14, and hence ensuring a long life for the motor-pump unit.

Variations in the volume of the oil in the motors is compensated by expansion and contraction of a flexible tank 66. The tank comprises an assembly of one or more welded metal bellows. Each bellows is equipped at its bottom end with a male fastening 67 and at its top end with a female fastening 68. The female fastening 68 at the top of the top bellows is screwed (69) to a support member 70 which is centered in an outer tube 71, and which is held in place by a ring 72 screwed down into the tube 71. The ring 72 is split and includes a jamming screw 73. An O-ring 74 seals the tube 71 to the support member 70. Likewise, an O-ring 75 seals the top bellws to the support member, and similar rings seal successive bellows to one another.

The male fastening 67 of the bottom bellows is fixed to a bottom plate 76 by screws 77. Sealing is agin provided by an O-ring 75. The screws 77 are seated on flat sealing washers 78.

The bottom plate 76 of the tank separates the tank 66 from the surrounding medium, eg. crude oil, when the unit is lowered down a well.

The pressure of the oil in the tank is raised by the thrust of a first, or outer, spring 79 and of a second, or inner, spring 80. The thrust is applied via an intermediate thrust block 81 and a both way thrust member 82 having ball bearings.

The purpose of the intermediate thrust block 81 and the ball bearing thrust member 82 is to avoid transmitting any torsion to the tank 66 when the springs bear against it.

The thrust from the inner spring 80 is transmitted to the thrust block 81 by release means enabling the spring 80 to relax once its compression force has reached a predetermined limit. The release means includes a rod 83 for transmitting the thrust to the thrust block 81. A tube 84 is slidably mounted on the rod 83, and is then held fast thereon by balls 85 housed in the wall of the tube 84 and received in a groove 86 in the rod 83. The balls 85 are held radially in the groove 86 by a sleeve 87 which slides over the tube 84 and which is urged downwardly to a ball-retaining position by a spring 89. The downward travel of the sleeve 87 is limited by a washer 88 on the rod 83. The washer 88 is held on the rod 83 by a spring clip 90. Thrust from the inner spring 80 is transmitted to the sliding tube 84 by a sleeve 91 which bears against the tube 84. A scraping washer 92 is mounted at the top end of the tube 84.

The outer spring 79 is guided between the outer tube 71 and a liner tube 93 and it thrusts against a washer 94 centered on the tube 93 and blocked by a step 94A in the liner tube 93. The inner spring 80 is guided between the inside of the liner tube 93 and a tube 95, and thrusts against a support block 96 which holds the bottom ends of the tubes 93 and 95 relative to the outer tube 71. The block 96 is centered in the tube 71 and is held in place by a split ring 97 which is screwed into the tube 71 from the bottom and then jammed using a screw 98. The module as a whole is closed by an end block 99.

At the top of the liner tube 93 there is a disk 100 which serves as a guide for the rod 83.

The top of the tube 95 serves as a stop for the sleeve 87 when the tank 66 extends, thereby compressing the the outer and inner springs 79 and 80. There thus comes a time when the sleeve 87 slides over the tube 84, thereby releasing the balls 85 and hence disconnecting the tube 84 from the rod 83. This is explained in greater detail below.

The module 8 is situated at the bottom end of a motorpump unit, below the bottom end of the motor shaft, and it is screwed into the bottom of the next module up, which is the motor 1 in the example described. The unit is filled and lowered into a well as follows: The motors 1, 2 and 3 together with the modules 7 and 8 are assembled, and the bleed hole 39 of the sealing module 7 is left open. All the modules are at atmospheric pressure. The flexible tank 66 is completely compressed by the combined action of the springs 79 and 80. The motors and the module 8 are filled with oil which runs down to the bottom 76 of the flexible tank 66. The oil is inserted via the top of the sealing module 7 through the bore in its hollow shaft 12. The oil level rises until it reaches the bleed hole 39 just below the sealing fitting 13, 14, by which time all the empty space inside the motors and the module 7 has been filled with oil. The pressure P1 then in the flexible tank 66 depends on the density d of the oil and on the height of the column of oil from the bottom 76 of the tank 66 up to the fitting 13, 14. At the fitting, the pressure of the oil is atmospheric pressure P2.

The pressure P1 at the bottom 76 of the tank 66 compresses the springs 79 and 80 and the tank expands until equilibrium is achieved between the thrust exerted by the springs and the thrust exerted by the pressure P1.

The bleed hole 39 is then closed with its stopper 38. The voids marked A, B and C in the module 7 are also filled, via the hole 63. The oil is allowed to de-gas and the hole is closed with its stopper 65. The pumps are then assembled.

The entire assembly is then lowered down a well and the air which previously surrounded the flexible tank 66 is replaced by the fluid in the well. The increasing pressure of the surroundings as the unit is lowered is thus transmitted by the tank 66 to the oil inside the motors. As the unit is lowered the temperature also rises. The increasing temperature expands the oil, causing the flexible tank 66 to lengthen.

The pressure inside the tank 66 is thus equal to the surrounding pressure due to the column of fluid above the bttom 76 of the tank 66, plus the pressure due to the thrust of the springs.

The release mechanism described above enables the value of the excess pressure to be limited to a predetermined maximum. Release takes place as follows. As the tank 66 expands due to rising temperature, there comes a moment when the sleeve 87 comes to bear against the top of the tube 95. Thereafter the tube 84 slides down past the blocked sleeve 87 compressing the spring 89, and enabling the balls 85 to leave the groove 86, thereby disconnecting the tube 84 from the rod 83, and hence allowing the inner spring 80 to relax, ie. by sliding the tube 84 along the rod 83. Thereafter the excess pressure is supplied only by the outer spring 79 which is designed so that its maximum excess pressure cannot exceed the maximum permissible excess pressure.

The means described above can be used to absorb any variation in the volume of the internal medium (oil) while avoiding any risk of the external medium penetrating into the motors. This means that a very high number of on/off cycles can be performed. The excess pressure also ensures that the mechanical sealing fitting 13, 14 in the module 7 performs excellently. The second, or inner spring 80 serves to support the column of oil inside the unit when the surrounding pressure is atmospheric and to prevent the flexible tank 66 from expanding too much at this point, so that it has room to expand when the oil heats. When the spring 80 is released, the weight of the inside column of oil is compensated by the external pressure due to the column of fluid in which the unit is immersed. Such difference as remains is due to the difference of density between the fluids inside and outside the unit and is proportional to the height of the column of fluid inside the unit and to said difference in density. The outer spring 79 is much less stiff than the inner spring 80, and serves during operation to maintain a desired excess pressure inside the motor, and in any event to keep the excess pressure below that maximum which can be withstood by the bellows.

By way of a non-limiting numerical example, typical values could be as follows:

Inner spring 80: maximum thrust 320 Kg at deflection 550 mm.

Outer spring 79: maximum thrust 300 Kg at deflection 1130 mm.

Area of bottom of flexible tank 66: 102 cm$^2$.

density of oil at 20° C.: 0.873 expansion of oil for a temperature rise of 130° C.: 9.5%

Initially, before the motors are filled with oil, the tank is fully compressed by the springs which are prestressed by 151 mm (outer spring 79) and 110 mm (inner spring 80).

71 liters of oil are then poured in, causing the flexible tank 66 to expand by 1 dm$^3$. The column of oil is then 28 meters (m) high, giving a pressure at the bottom of the tank of 2.44 bars, giving a force of 245 kg.

As the unit is lowered down the well, the temperature rises, the oil expands and the pressure increases. The release device limits the pressure to 4.5 bars ie. 450 kg. Just before release, the outer spring supports said 450 kg less the 320 kg of maximum inner spring load, giving 130 kg. After release, the pressure is thus 1.3 bars and the tank contains 3.5 dm$^3$ of oil, giving an elongation of 340 mm. The unit is lowered further.

The motors are started up, and when operating at 150° C., the 71 liters of oil expand to occupy 78 liters, giving 8 liters of oil in the bellows which is capable of expanding up to 10 liters. With 8 liters, and a leakage rate of 0.5 cm$^3$ per hour through the sealing fitting in the module 7, there is a supply of oil that will last for 1600 hours.

Naturally, these figures are given merely by way of example.

Likewise the application of the invention to a motor-pump unit for use in an oil well is not a limitation on the scope of the invention.

We claim:

1. A motor-pump unit for use submerged in a well, the motor-pump unit comprising: a motor portion, a pump portion, and a dynamic sealing system, all interconnected, the motor portion being located below the pump portion and being filled with a fluid to protect the motor portion from ingress of a medium which surrounds the motor-pump unit in use, the pump portion being connected to be driven by the motor portion so as to pump said surrounding medium, and the dynamic sealing system being located between the motor portion and the pump portion to transmit drive from the motor portion to the pump portion while preventing ingress of said surrounding medium into the motor portion, and wherein the motor portion includes a flexible compensation tank including a wall situated at the bottom thereof and in communication with said fluid in the motor portion, said flexible tank being subjected both to pressure from the surrounding medium and to a compression force exerted by resilient compression means acting between the bottom of the motor portion and said wall of the flexible tank, thereby ensuring that the fluid inside the motor portion is at a higher pressure than the surrounding medium so that any leakage through the dynamic sealing means is outwardly from the motor portion rather than inwardly, the improvement wherein said compression means includes a first spring and a second spring, means disposing said springs such that the flexible tank is subjected to the sum of their resilient thrusts, and wherein said unit comprises release means for applying said second spring thrust and to cause said second spring to be released and to relax once its displacement reaches a predetermined value.

2. A motor-pump unit according to claim 1, wherein said unit comprises an assembly including a ball-bearing thrust member to effect application of thrust from said first and second springs to said flexible tank to prevent torsion from being transmitted to the tank.

3. A motor-pump unit according to claim 1, wherein said release means comprises: a rod transmitting thrust to the tank; a tube slidably mounted on said rod; means for disposing said second spring to apply thrust to said tube; said rod having a peripheral groove and said tube having openings therethrough aligned with said groove, ball bearings received by said openings for transmitting thrust between the tube and the rod; a sleeve slidably mounted on said tube and covering said openings to hold the ball bearings captive; and a stop disposed to engage said sleeve and hold it substantially at said predetermined value of displacement, whereby the assembly is such that any further displacement of the rod causes the tube to slide relative to the sleeve against the resilient action of the second spring until the sleeve uncovers the openings, thereby releasing the balls, whereupon thrust is no longer transmitted between the rod and the tube, thereby leaving the second spring free to relax.

* * * * *